(12) United States Patent
Kim

(10) Patent No.: US 7,069,029 B2
(45) Date of Patent: Jun. 27, 2006

(54) METHOD FOR TRANSMITTING MULTI-SMS IN MOBILE TELEPHONE

(75) Inventor: Bo-Yon Kim, Kumi-shi (KR)

(73) Assignee: Samsung Electronics Co., Ltd. (KR)

( * ) Notice: Subject to any disclaimer, the term of this patent is extended or adjusted under 35 U.S.C. 154(b) by 300 days.

(21) Appl. No.: 10/353,738

(22) Filed: Jan. 29, 2003

(65) Prior Publication Data

US 2003/0236097 A1 Dec. 25, 2003

(30) Foreign Application Priority Data

Jun. 25, 2002 (KR) ............................... 2002-35603

(51) Int. Cl.
*H04Q 7/20* (2006.01)

(52) U.S. Cl. ..................... 455/466; 455/566; 455/514

(58) Field of Classification Search ................ 455/466, 455/566
See application file for complete search history.

(56) References Cited

U.S. PATENT DOCUMENTS

| | | | | |
|---|---|---|---|---|
| 5,673,259 A | * | 9/1997 | Quick, Jr. | 370/342 |
| 5,943,399 A | * | 8/1999 | Bannister et al. | 379/88.17 |
| 6,151,507 A | * | 11/2000 | Laiho et al. | 455/466 |
| 6,208,859 B1 | * | 3/2001 | Halvorson | 455/430 |
| 6,351,656 B1 | * | 2/2002 | Burgan et al. | 455/566 |
| 6,597,918 B1 | * | 7/2003 | Kim | 455/466 |
| 6,625,460 B1 | * | 9/2003 | Patil | 455/466 |
| 6,639,941 B1 | * | 10/2003 | Nakano | 375/219 |
| 6,804,508 B1 | * | 10/2004 | Yamada | 455/414.1 |
| 6,807,411 B1 | * | 10/2004 | De Kermadec | 455/412.1 |
| 2001/0041578 A1 | * | 11/2001 | Na | 455/466 |
| 2002/0058522 A1 | * | 5/2002 | Kim et al. | 455/466 |
| 2002/0177456 A1 | * | 11/2002 | Kimoto et al. | 455/466 |
| 2003/0078033 A1 | * | 4/2003 | Sauer et al. | 455/412 |
| 2003/0125054 A1 | * | 7/2003 | Nakano | 375/219 |
| 2003/0139193 A1 | * | 7/2003 | Buckley | 455/466 |
| 2003/0216138 A1 | * | 11/2003 | Higuchi et al. | 455/412.1 |
| 2004/0203610 A1 | * | 10/2004 | Deeds | 455/412.1 |

* cited by examiner

Primary Examiner—Sonny Trinh
Assistant Examiner—Huy Phan
(74) Attorney, Agent, or Firm—Dilworth & Barrese LLP

(57) ABSTRACT

Disclosed is a method for transmitting multi-SMS in a mobile telephone, the method including the steps of: inputting a message and saving the message in a message storage; when the message storage is selected, displaying an input box for each message stored in the message storage; inputting a transmission order in the input boxes for messages to be transmitted; inputting a destination number; and, if a transmission order is given, transmitting the messages stored in the message storage in order of the transmission order inputted in the input boxes of the messages.

5 Claims, 4 Drawing Sheets

METHOD FOR TRANSMITTING MULTI-SMS IN MOBILE TELEPHONE

PRIORITY

This application claims priority to an application entitled "Method for Transmitting Multi-SMS in Mobile Telephone" filed in the Korean Industrial Property Office on Jun. 25, 2002 and assigned Serial No. 2002-35603, the contents of which are hereby incorporated by reference.

BACKGROUND OF THE INVENTION

1. Field of the Invention

The present invention relates generally to mobile telephones, and more particularly, to a method for transmitting multi-SMS (short message service) to receiver(s) using a mobile telephone.

2. Description of the Related Art

In general, a mobile telephone, besides voice communication, can provide text message services or image services. One type of text message service is a short message service (SMS) in which a user writes text for the SMS message and transmits the message to a destination party. Normally, the maximum allowed capacity for the SMS is 80 bytes, that is, the user can input 40 Korean characters (syllables) only. Therefore, if the mobile telephone user wants to transmit an SMS message with greater than 80 bytes, he or she had to split the SMS message several times.

SUMMARY OF THE INVENTION

It is, therefore, an object of the present invention to provide a method for transmitting multi-SMS to one or more receivers simultaneously in a mobile telephone.

To achieve the above objects, there is provided a method for transmitting multi-SMS in a mobile telephone which includes the steps of: inputting a message and saving the message in a message storage; when the message storage is selected, displaying an input box for each message stored in the message storage; inputting a transmission order in the input boxes for messages to be transmitted; inputting a destination number; and, if a transmission order is given, transmitting the messages stored in the message storage the transmission order inputted in the input boxes of the messages.

BRIEF DESCRIPTION OF THE DRAWINGS

The above and other objects, features and advantages of the present invention will become more apparent from the following detailed description when taken in conjunction with the accompanying drawings in which:

FIGS. 3A through 3D are diagrams illustrating an operation involved with selecting at least one message in a message storage of a mobile telephone in accordance with the preferred embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are omitted to avoid obscuring the invention with unnecessary detail.

Figure 1:
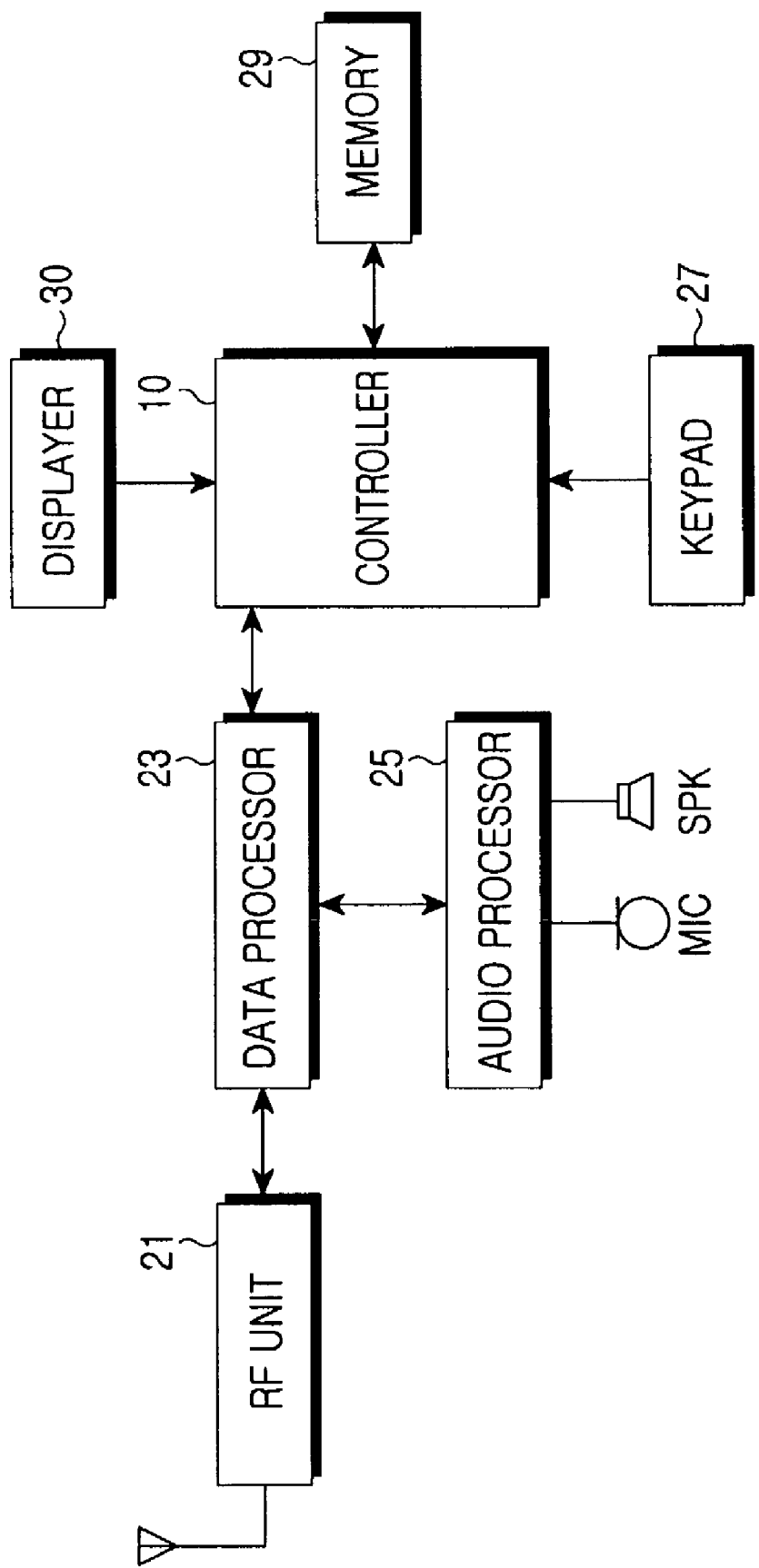
FIG. 1 is a schematic diagram showing a structure of a mobile telephone for implementing the method of the present invention.

FIG. 1 is a schematic diagram showing a structure of a mobile telephone for implementing the method of the present invention. Referring to FIG. 1, an RF unit 21 performs communication for the mobile telephone. The RF unit 21 includes an RF transmitter for increasing and amplifying the frequency of transmitted signals, and an RF receiver for performing low-noise amplification and for decreasing the frequency of received signals. A data processor 23 includes a transmitter for encoding and modulating the transmitted signals, and a receiver for decoding and demodulating the received signals. That is, the data processor 23 includes a modem and a CODEC.

An audio processor 25 outputs via a speaker (SPK) audio signals that are outputted from the data processor 23, and transfers audio signals that are generated by a microphone (MIC) to the data processor 23. A keypad 27 includes function keys and other keys for inputting numbers and characters, and for setting up various functions. The keypad 27 preferably includes keys for shifting positions, message selection, and transmission.

A memory 29 includes a program memory and a data memory. Stored in the program memory are programs for controlling general operations of a mobile telephone, and programs for inputting a transmission order of messages that a user wants to simultaneously transmit out of a message storage in the sequential transmission order that has been inputted via an input box. Data generated in the course of executing the aforementioned programs are typically temporarily stored in the data memory.

A controller 10 controls overall operations of the mobile telephone, and might include the data processor 23. Also, the controller 10, according to the preferred embodiment of the present invention, through commands entered via the keypad 27, controls the display of numbers representing the transmission order marked on the input box of the messages the user chooses to transmit, and controls the overall transmission, i.e. when the transmission key is pressed, the selected messages are simultaneously sent in transmission order. Displayer 30, under the control of the controller 10, displays the messages generated in the course of executing the programs.

The operation of the mobile telephone is now explained with reference to FIG. 1. First of all, when the user attempts to make a call by performing a dialing operation through the keypad 27, and sets a calling mode, the controller 10 detects this, and processes dial information that is received through the data processor 23, and converts the information to a RF signal through the RF unit 21, and lastly, outputs the converted signal. If another subscriber generates an acknowledge signal, the controller detects this through the RF unit 21 and through the data processor 23. Once a voice channel is formed, the audio processor 25 allows the user to perform communication.

Meanwhile, in a termination mode, the controller 10 detects the termination mode through the data processor 23, and generates a ring signal through the audio processor 25. If the user answers, the controller 10 detects the answer, and the user is allowed to perform communication over the voice channel that is formed, utilizing the audio processor 25.

Even though the presently described embodiments of voice communication in the calling mode and in the termination mode, other data, including packet data and image data, can be also used for communication. In addition, while in a call-waiting mode, or when the user performs text communication, the controller 10 can display data on the displayer 30.

To transmit more than one message at once using the mobile telephone, the user repeatedly inputs, through the keypad 27, the messages to be transmitted and stores the messages in the message storage. When the inputting and the storing of the messages to be transmitted are completed, the user selects the message storage. The controller 10 will display, through the displayer 30, an input box for the messages stored in the message storage. Then, the user of the mobile telephone decides the transmission order by inputting numbers, through the keypad 27, in the input boxes of the messages to be transmitted. To make sure that the messages the user of the mobile telephone selected are duly transmitted to a receiver, the controller 10 controls the overall procedure involved with the transmission of the messages according to the transmission order inputted in the input boxes.

Figure 2:
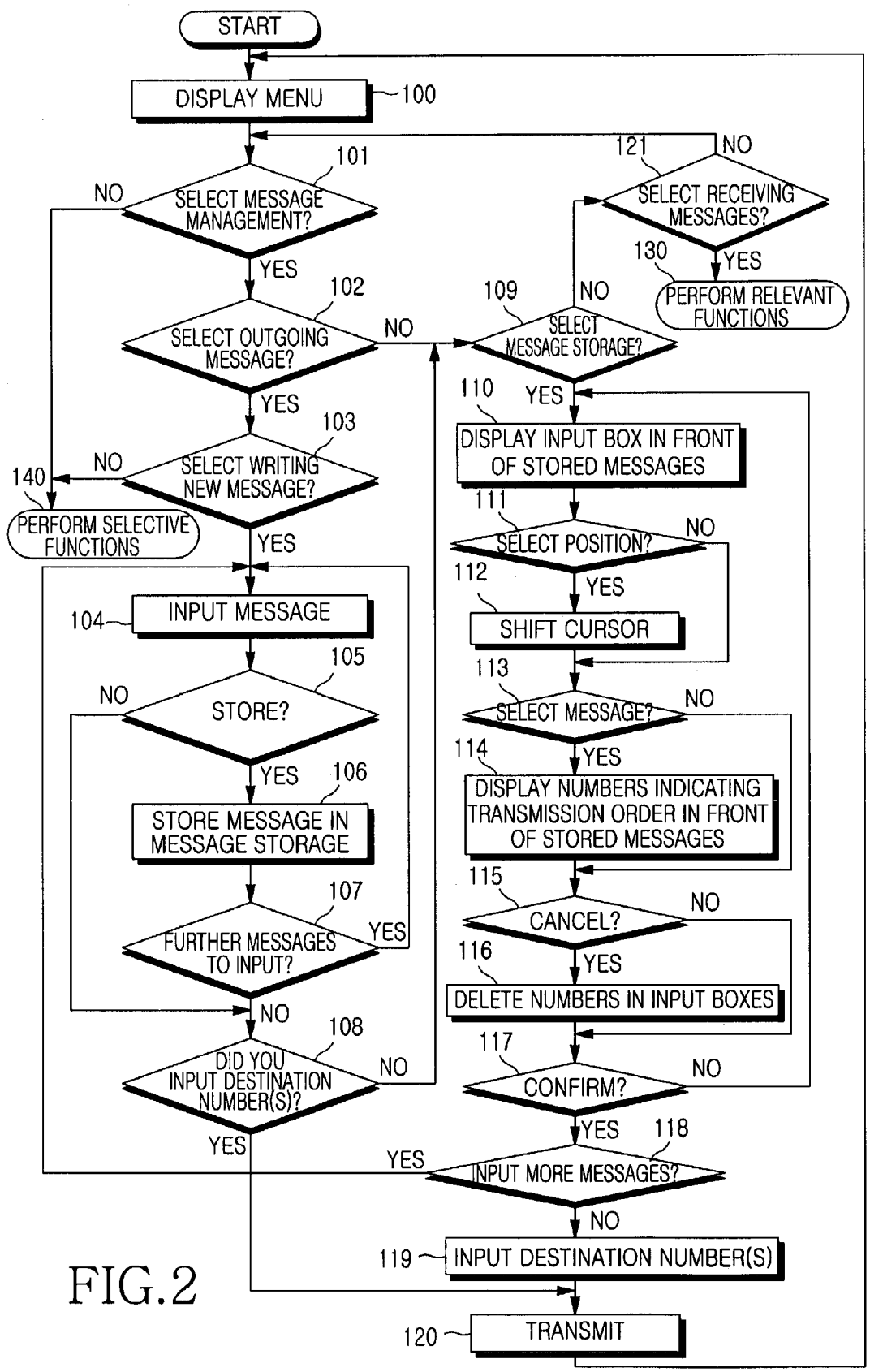
FIG. 2 is a flow chart illustrating a method for transmitting multi-SMS (short message service) in a mobile telephone in accordance with a preferred embodiment of the present invention.

FIG. 2 is a flow chart illustrating a method for transmitting multi-SMS messages in a mobile telephone in accordance with a preferred embodiment of the present invention.

The following explains the preferred embodiment of the present invention, referring to FIGS. 1 through 3D. When the mobile telephone user presses a menu key on the keypad 27, the controller 10 detects this, and displays a menu by controlling the displayer 30 (Step 100). From the displayed menu the user selects through the keypad 27 a message management selection. If the controller again detects this, different kinds of messages will be displayed on the displayer 30 (Step 101). When the different kinds of messages are shown, the user selects an out-going message, and the controller 10, by controlling the displayer 30, displays the kinds of out-going message (Step 102). The various kinds of out-going messages are displayed on the displayer 30, when the user selects 'new message' and the controller 10 has the displayer 30 display a new window for the user to input messages he or she wants (Step 103).

After the user inputs the message (Step 104) and chooses to store the message (Step 105), the controller 10 detects such, and stores the inputted messages in the message storage (Step 106). The controller 10 then determines whether the mobile telephone user wants to input more messages (Step 107), and if so, lets the user repeat the steps 104 through 107. If the user has finished inputting the message(s) in the course of performing the steps 104 through 107, the controller 10 detects this (Step 107), and goes to step 108, asking whether the user inputted destination phone number(s).

Figures 3A, 3B:
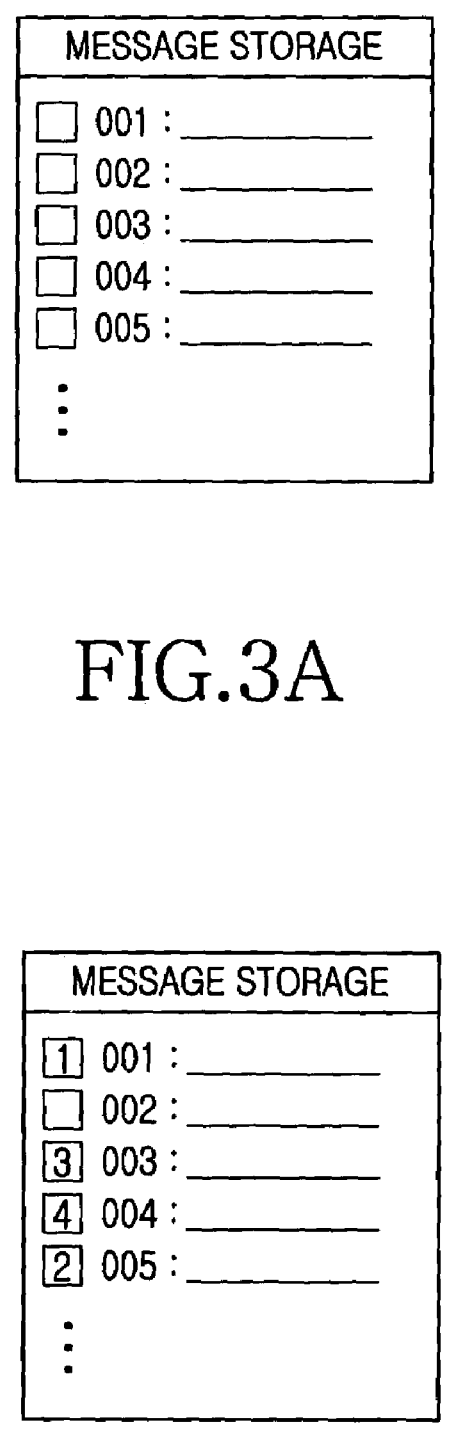

In case that the user does not input designation phone number(s) at step 108 but selects the message storage menu, the controller 10 detects this (Step 109), and controls the displayer 30 to display the messages that have been stored in the message storage as shown in FIG. 3A (Step 110). If the user does not select message storage at Step 109, the preferred embodiment asks if the user wants to select receiving messages (Step 121), and proceeds depending upon the user's selection. As FIG. 3A depicts, in front of each message, an input box is provided for the user to input the transmission order.

As described in steps 111 through 16, the user puts the cursor on one of the messages to be transmitted, and inputs a number in a selected message. Then, as illustrated in FIG. 3B, the numbers indicating the transmission order are shown in the input boxes of the selected messages.

If the user reinputs the transmission order and thereby duplicates the transmission order for any message, the controller 10 gives priority to the transmission order that is inputted later, and rearranges the selected messages for transmission. Here, the messages with the numbers marked on the input boxes are the ones to be transmitted at once, according to the transmission order.

A position select key is also provided, for which an up/down key of the navigation key can be used. Further, transmitting the selected messages in the transmission order inputted in their input boxes can be cancelled as well. This can be done by pressing the cancel key (Step 115). Once the user presses the cancel key, the numbers in the input boxes disappear and an original state is restored (Step 116).

Figures 3C, 3D:
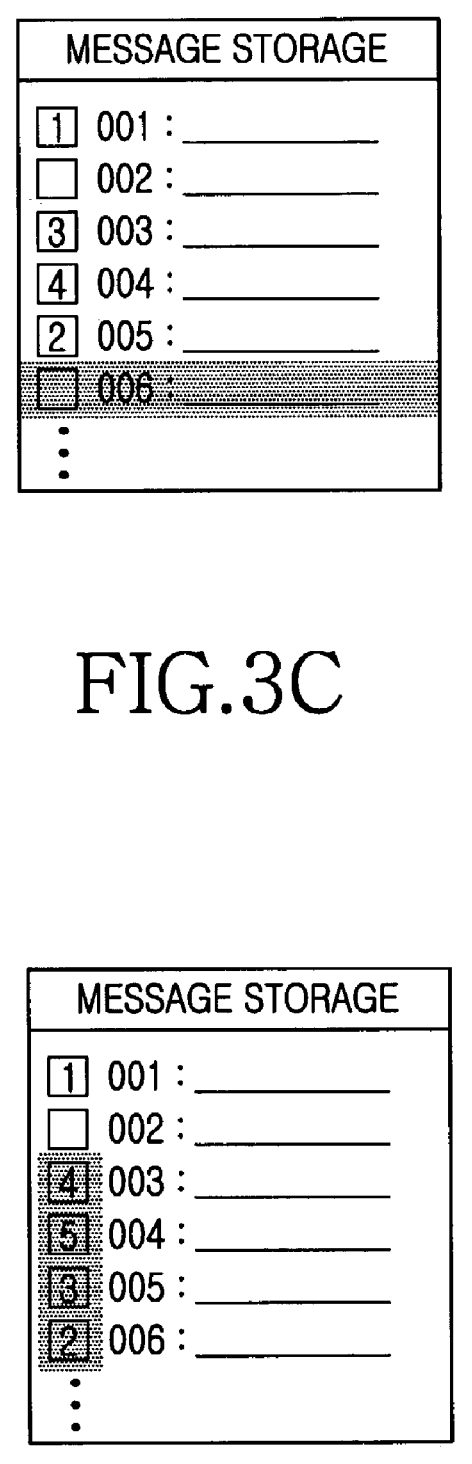

As shown in FIG. 3B, after selecting the messages to be transmitted at steps 111 through 116, if the user wants to input more messages for transmission, the controller detects this (Step 118), and lets the user input a new message through the steps 104 through 107. When the user inputs the new message and stores the new message in the message storage (Steps 104 through 107), and then selects the message storage again, as FIG. 3C represents, the new message will also be displayed. As described above, if the user inputs a transmission number already used in the input box of the additionally stored message, the controller gives priority to the number that is inputted later, and rearranges the transmission order, as depicted in FIG. 3D.

When the user completes selection of the messages to be transmitted, the controller 10 detects such (Steps 117 and 118), and asks the user to input the destination phone number through the displayer 30 (Step 119). If more than one destination phone number is inputted (Step 119), the controller 10 controls the inputted destination phone number (s) to simultaneously transmit the messages in order of the transmission number marked on the input box, respectively.

If the user wishes to transmit only his or her currently inputted message, the user can input the message at step 104, and does not select 'store message'. Then, the controller 10 concludes that the mobile phone user wants to transmit the currently inputted message only (Step 105), and asks the user to input destination number(s) (Step 108). When the user finishes inputting the destination number(s), the controller 10 transmits the message to the inputted destination numbers (Step 120). In conclusion, the present invention includes the benefits of allowing, by simultaneously transmitting more than one messages out of the message storage, the mobile phone user to not have to transmit the messages several times and allows oversized messages to be simultaneously transmitted, in transmission sequence order. Moreover, since the user does not have to press a number of keys any more, a large amount of time can also be saved.

While the invention has been shown and described with reference to a certain preferred embodiment thereof, it will be understood by those skilled in the art that various changes in form and details may be made therein without departing from the spirit and scope of the invention as defined by the appended claims.

What is claimed is:
1. A method for transmitting multi-SMS (Short Message Service) in a mobile terminal, the method comprising the steps of:
    inputting a plurality of unique SMS messages and saving the messages in a message storage;

when the message storage is selected, displaying an input box for each of the unique SMS message stored in the message storage;

inputting a transmission order in the input boxes for the unique SMS messages to be transmitted;

inputting a destination number; and if the transmission order is given, transmitting each of the unique SMS messages stored in the message storage in the transmission order.

2. The method defined in claim 1, wherein the SMS message is a character message.

3. The method defined in claim 1, wherein the transmission order displayed in the input boxes is indicated by numbers.

4. The method defined in claim 1, further comprising the steps of:

when the transmission order is inputted in the input boxes for the SMS messages in the message storage, inputting a new SMS message;

storing the new SMS message in the message storage; and inputting the transmission order in an additional input box for the new SMS message.

5. The method defined in claim 4, wherein, if the transmission order inputted in the additional input box for the new SMS message is a duplicate, the transmission order is rearranged to give the new SMS message priority over the previously entered SMS message having the duplicate transmission order.

* * * * *